United States Patent [19]

Yoshida

[11] 4,350,654
[45] Sep. 21, 1982

[54] METHOD OF PROVIDING DISPLAY ON MOLDED BASE

[75] Inventor: Akihiro Yoshida, Tokyo, Japan

[73] Assignee: Sony Corporation, Tokyo, Japan

[21] Appl. No.: 228,661

[22] Filed: Jan. 26, 1980

[30] Foreign Application Priority Data

Feb. 6, 1980 [JP] Japan .................................. 55-13245

[51] Int. Cl.³ .......................... B29D 3/00; B29D 9/10
[52] U.S. Cl. .................................. 264/129; 264/139; 264/162; 264/247; 264/261; 264/278; 264/279; 312/7.1; 428/14; 428/67; 428/187
[58] Field of Search ................. 312/7.1, 7.2; 361/422; 455/347; 220/4 R; 264/271.1, 24 T, 245, 246, 161–163, 277, 278, 279, 129, 261, 278; 428/67, 187, 13, 14, 38; 206/45, 34

[56] References Cited

U.S. PATENT DOCUMENTS

| | | | |
|---|---|---|---|
| 334,786 | 1/1886 | La Bau | 264/247 |
| 425,357 | 4/1890 | Wendlinger | 264/246 |
| 1,507,085 | 9/1924 | Newman | 264/263 |
| 1,612,825 | 1/1927 | Lynch | 264/245 |
| 1,635,684 | 7/1927 | Mell | 264/261 |
| 2,602,035 | 7/1952 | Sullivan | 264/246 |
| 2,602,036 | 7/1952 | Sullivan | 264/139 |
| 2,609,570 | 9/1952 | Danielson et al. | 264/274 |
| 2,651,079 | 9/1953 | Michaelson et al. | 264/261 |
| 3,086,250 | 4/1963 | Gits | 264/247 |
| 3,125,831 | 3/1964 | Marsch et al. | 264/261 |
| 3,192,567 | 7/1965 | Abernathy et al. | 264/265 |
| 3,231,646 | 1/1966 | Conder et al. | 264/261 |
| 3,502,496 | 3/1970 | Jarvis et al. | 264/245 |
| 4,073,854 | 2/1978 | Burry | 264/245 |
| 4,085,176 | 4/1978 | Nakayama | 264/278 |
| 4,263,242 | 4/1981 | Jenkins | 264/139 |

*Primary Examiner*—Willard E. Hoag
*Attorney, Agent, or Firm*—Hill, Van Santen, Steadman, Chiara & Simpson

[57] ABSTRACT

A molded base, for example, a cabinet of a radio receiver, is molded with a synthetic resin and at least one display element made of, for example, a metal, is embedded in the molded base so as to expose one surface of the element. The surface of the display element is then covered with a finish coating to form a substantially uniformly coated layer. The coating on the surface portion of the embedded display element and further at least a portion of the surface of the display element is subjected to mechanical treatment so that the material surface portion is exposed on the display element, whereby the molded base is provided with an aesthetic and decorative display thereon.

7 Claims, 10 Drawing Figures

METHOD OF PROVIDING DISPLAY ON MOLDED BASE

BACKGROUND OF THE INVENTION

1. Field of the Invention

The present invention relates to a method for providing a display on a molded base and, more particularly, to a method of providing a display on a molded base having an aesthetic and decorative design on a molded base by embedding a display element such as a plate or frame or any other similar member in the molded base and forming a finish coating over the surface portion of the embedded display element and exposing a portion of the surface of the display element.

2. Description of the Prior Art

Devices, instruments, apparatus of the like such as electronic devices, e.g., radio receivers, carry names of manufacturers, trade marks, names of items or the like on their cabinets. One of the simplest methods to provide a display on the cabinet of a device, or the like, or form a pattern display for decorative purposes thereon, is to subject the cabinet, for example, of synthetic resin to a silk screen printing process. This method, however, does not provide a display of high quality and durability because it is difficult to produce a decorative and aesthetic appearance on the display and such a display tends to be removed or come off with time, due to abrasion. In order to give a metallic appearance to a display on the cabinet of a device or the like, it has been proposed that a decorative aluminum plate with the name of a manufacturer, a trade mark or the like is allowed to adhere to a surface of the surface-finished cabinet of synthetic resin. This method apparently requires the use of an adhesive and consequently a step of coating the adhesive on the decorative aluminum plate. This method also requires time for drying the coated adhesive before the resulting cabinet is transferred to a step which follows so that it takes a longer time than a step in which no adhesive is employed. The use of the adhesive also offers a risk that the coated adhesive will be pressed out between the connecting portion and consequently the resulting appearance is impaired. The decorative plate so attached to the cabinet may in some cases present a disadvantage in that it might come off of the cabinet with time, due to aging.

SUMMARY OF THE INVENTION

Therefore, an object of the present invention is to provide a method for providing a decorative and aesthetic display on a cabinet of synthetic resin, which can remove or improve the defects and disadvantages conventional methods present.

Another object of the present invention is to provide a method for providing a decorative and aesthetic display on the cabinet of a device, instrument, apparatus or the like which does not require a step of coating an adhesive on the surface-finished cabinet thereof.

A further object of the present invention is to provide a method for providing a decorative and aesthetic display on the molded base of the cabinet therefor which does not provide a risk that the surface of the cabinet thereof is stained or impaired in appearance.

A still further object of the present invention is to provide a method for providing a decorative and aesthetic display which can allow the display portion to be attached or secured to the cabinet surface in such a manner that it cannot be readily removed or come off.

A still further object of the present invention is to provide a method for providing a decorative and aesthetic display which can be secured or attached to the cabinet surface with high precision and accuracy.

According to one aspect of the present invention, there is provided a method of forming a display on the molded base which comprises the steps of molding a synthetic resin into a base with a display element embedded in the synthetic resin so as to expose a portion of the surface of the embedded display element; covering the exposed surface portion of the display element with a finish coating together with the surface of the synthetic resin base; and subjecting the coating on the surface portion of the embedded display element to mechanical treatment so as to expose the surface portion thereof.

The above and other objects, features and advantages of the present invention will become apparent during the course of the following detailed description of an illustrative embodiment which is to be read in connection with the accompanying drawings.

DESCRIPTION OF THE PREFERRED EMBODIMENTS

Figure 1:
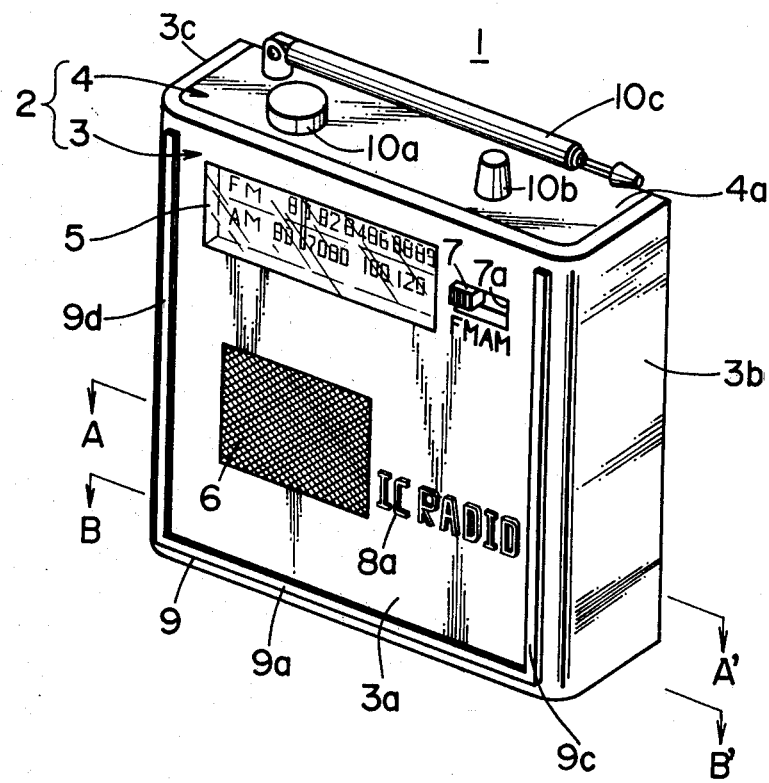
FIG. 1 is a perspective view illustrating a radio receiver having a front base panel which is prepared by the method in accordance with the present invention.
Figure 5:
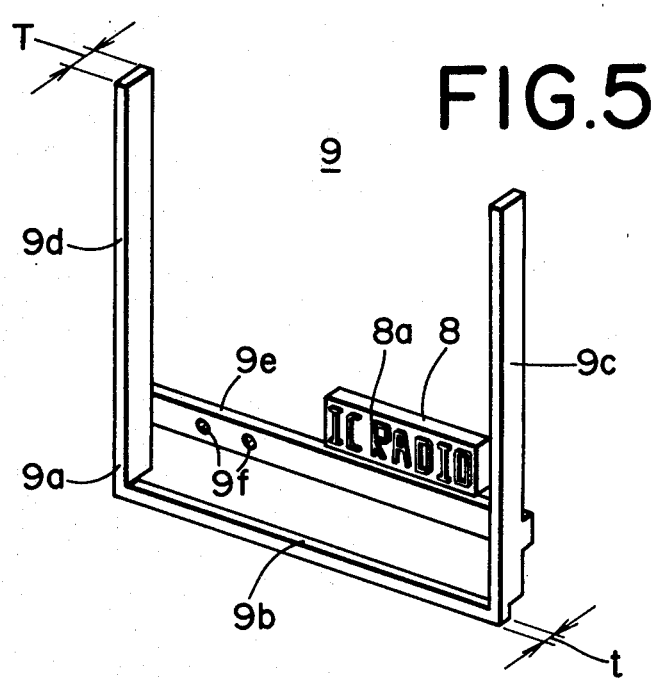
FIG. 5 is a perspective view illustrating a decorative metal element with the form of a plate and another display element in the form of a frame to be embedded in the front base panel.
Figure 6:
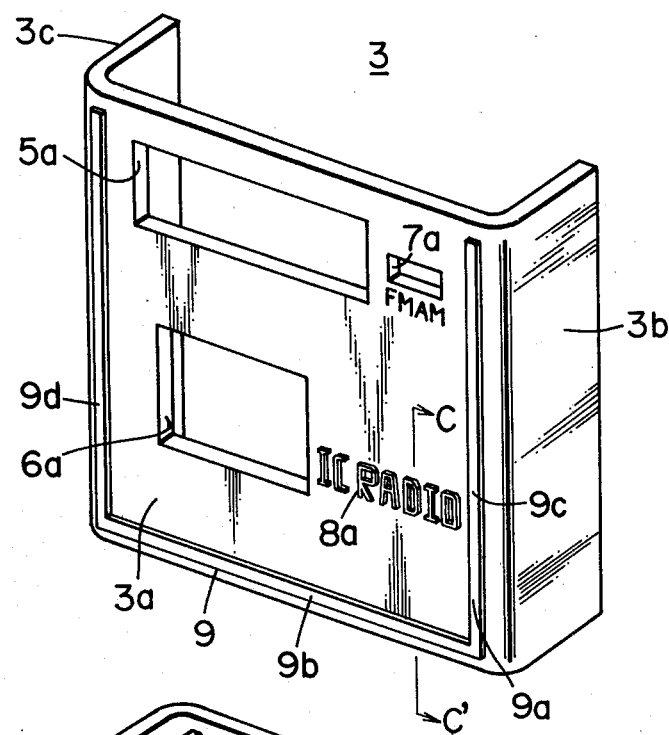
FIG. 6 is a perspective front view illustrating the front base panel of the radio receiver of FIG. 1 obtained by the method in accordance with the present invention.
Figure 7:
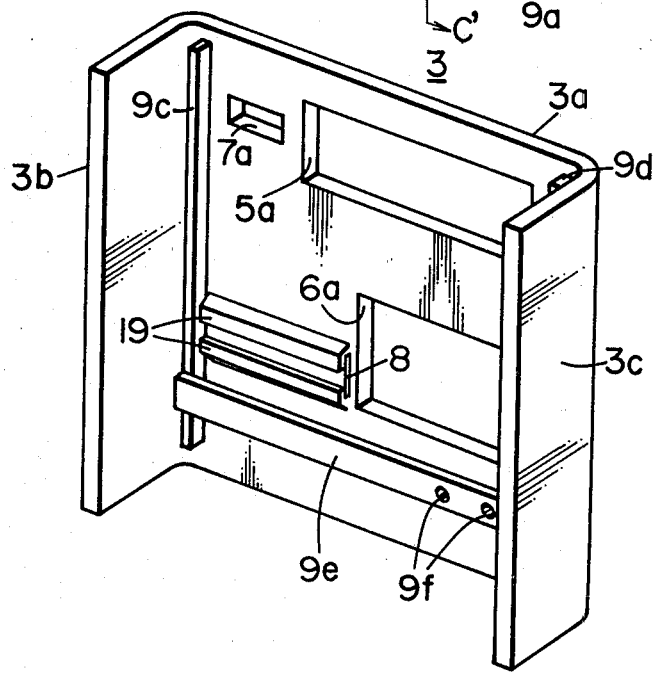
FIG. 7 is a perspective back view illustrating the front base panel of FIG. 6.

Referring to FIG. 1, there is shown a radio receiver 1 having a cabinet 2 composed of a front base panel 3, which is manufactured in accordance with the method of the present invention, and a rear base panel 4. As best shown in FIGS. 6 and 7, the front base panel 3 includes a front panel portion 3a, a right side panel portion 3b and a left side panel portion 3c. The rear base panel 4 includes a rear panel portion (not shown), an upper side panel portion 4a, and a lower side panel portion (not shown). The numeral 5 shows a tuning scale plate. The front panel portion 3a has a speaker grille 6 composed of a wire net for protecting a speaker (not shown) to be fitted thereto. An operating knob 7 is also provided through a hole 7a of the front panel portion 3a. The numeral 8 is a display element in the form of a plate, as shown in FIG. 5, having a display portion such as letters, figures or designs for representation or decoration; in this case, capital letters "IC RADIO", representing the item of goods are provided on the display element. It is, of course, to be noted that any variation and modification in the display portion can be made according to the purpose of the display element 8. For example, the numeral 9 is another type of the display element which may be in the form of a square U-shaped frame and which is used mainly for adorning the cabinet 2. A dial knob 10a is mounted on the upper side panel portion 4a of the rear base panel 4 and arranged so as to transfer the needle of the tuning scale plate 5 and operate a variable condenser disposed in the cabinet 2 to tune a desired receiving frequency. On the upper side panel portion 4a of the rear base panel 4, there is also provided a volume control knob 10b with a power transfer switch for turning on and off the power transfer and controlling the volume. The numeral 10c is a rod antenna mounted on the upper side panel portion 4a.

The method in accordance with the present invention can impart an aesthetic, decorative or metallic appearance of a display element on the surface of the front base panel 3 of the cabinet 2. The method involves the appearance of surface portions of the display elements 8 and 9 and any other display element in any appropriate form and of material different from the material of the front base panel 3. For example, when a metal is used as a material for the display element 8 or 9, this method can give a metallic appearance on the surface portion of the display element in good contrast to the appearance of the front base panel 3 itself.

Figure 2:
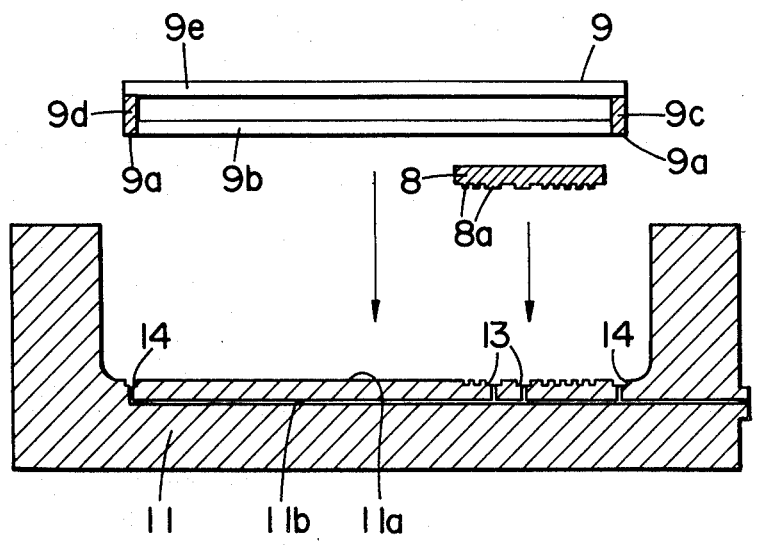
FIG. 2 is a cross-sectional view illustrating a female mold forming the front base panel to be used for the method in accordance with the present invention and taken along a line corresponding to the line A-A' of FIG. 1.

Turning now to FIG. 2, a female mold 11 has a cavity 11a for forming the front base panel 3 of the radio receiver 1 by means of the method in accordance with the present invention. The female mold 11 is provided at the inner surface of its cavity 11 with concave portions 13 to securely receive the display element 8. The concave portions 13 should be substantially equal in size to the display portions 8a or projected portions of the display element 8 although the shape of the concave portions 13 is in such a reverse relationship with the projected portions 8a as to secure and fit the projected portions 8a of the display element 8. The concave portions 13 may be formed on the surface of the inner cavity 11a of the female mold 11 by means of electrical discharge machining process. The electrical discharge machining process may be carried out using, for example, a copper cathode (not shown) having substantially the same shape and size as the projected portions or display portions 8a of the display element 8 to be copied on the surface of the inner cavity 11a of the female mold 11. This method can allow the accurate and precise copying of the projected portions 8a of the copper cathode at a predetermined portion on the surface of the inner cavity 11a in a reverse relationship. Similarly, a concave portion 14 for receiving the display element 9 in the form of, for example, a square U-shaped frame may be formed on the surface of the inner cavity 11a of the female mold 11.

Referring to FIG. 5, the display element 8 has display portions 8a in the form of projections on the plate. And the display element 9 has a display portion 9a in a square U-shaped form. It is to be noted, however, that shapes of the display portions of the display elements 8 and 9 or display portions of any other display element which may be disposed arbitrarily according to a desired appearance of the cabinet of a device or the like are not limited to particular ones and they may be in any appropriate shape and size. Materials for the display elements 8 and 9 and any other display element may include, for example, a metal such as aluminum, nickel or brass or any other suitable material and they may be different from each other while they should be different from the material and/or the color of the front base panel 3. The material may be chosen for the display element 8 or 9 according to a desired appearance on the front base panel 3 of the cabinet 2. Referring further to FIG. 5, the display element 9 includes a bottom frame portion 9b, a right side frame portion 9c, and a left side frame portion 9d. The bottom frame portion 9b has a thickness t thinner than the thickness of the front panel portion 3a of the front base panel 3 and the right and left side frame portions 9c and 9d have each a thickness T thicker than the thickness thereof. A crossbeam 9e is also disposed at the lower rear portions of the side frame portions 9c and 9d and provided with a hole or holes 9f for mounting parts of a device to be fitted in the cabinet 2.

Figure 3:
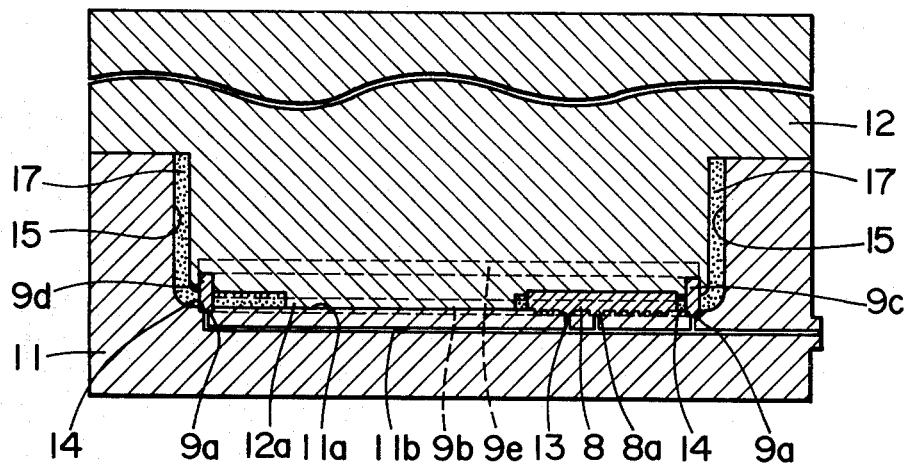
FIG. 3 is a cross-sectional view illustrating a female mol and a male mold forming the front base panel of the radio receiver as shown in FIG. 1 and taken along the line corresponding to the line A-A' of FIG. 1.
Figure 4:
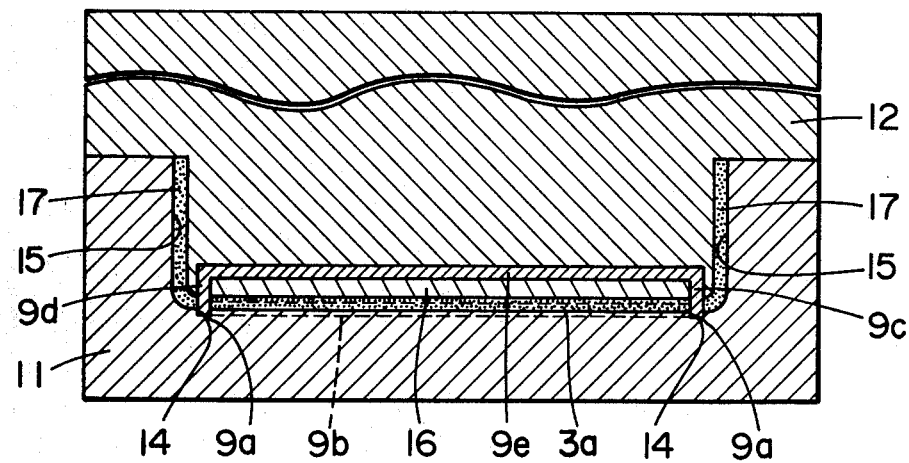
FIG. 4 is a cross-sectional view illustrating the female mold and the male mold shown in FIG. 3, and taken along a line corresponding to the line B-B' of FIG. 1.

Referring to FIGS. 3 and 4, the display or projected portions 8a of the display element 8 are inserted into and fitted to the concave portions or cavities 13 of the inner cavity 11a of the female mold 11. Likewise, the front display portions 9a in the square U-shaped form is fitted to the corresponding concave portion or cavity 14 thereof. In this case, the display elements are not required to have their surfaces finished or cleaned before attachment thereof to the female mold 11. In order to keep the display elements 8 and 9 from being withdrawn or removed from the respective concave portions 13 and 14 during the molding step of molding the front base panel 3, vacuum suction may be effected through a hole or holes 11b provided in the female mold 11 in such a manner that the hole or holes are arranged so as to communicate the exit or exits to the inner surfaces of the concave portions or cavities 13 and 14.

Referring further to FIGS. 3 and 4, a male mold 12 is then inserted into the cavity 11a of the female mold 11 and positioned at an appropriate position so as to provide a predetermined space 15 which defines the thickness of the wall of the front base panel 3. As best shown in FIG. 4, a transferrable mold 16 is also placed or located between the inner portion of the crossbeam 9e of the display element 9 and the imaginary back surface portion of the molded front panel portion 3a to define the back surface portion of the front panel portion 3a and prevent a molten material charged into the space 15 from being introduced into the space portion as defined therebetween. The transferrable mold 16 may be withdrawn from the interposed position in a direction vertical to the plane of the drawing after the charged material is cured to form the front base panel 3. As shown in FIG. 3, the male mold 12 may be provided with a projection 12a so as to define a hole or holes for mounting a part or parts of the device, e.g., radio receiver 1. The projection 12a is arranged so as to have a shape and size corresponding to the hole or holes to be disposed of in the front base panel 3. The projection 12a is also arranged such that its surface is brought into contact with the surface of the inner cavity 11a of the female mold 11 in such a manner as not to have the charged molten material fed into the portion defined by the surfaces of the male and female molds 11 and 12. The projection 12a may be formed integrally to or separately from the male mold 12. In the above-mentioned manner, there are formed the hole 5a for the tuning scale plate 5, the hole 6a for the speaker grille 6, the hole 7a for the operating knob 7 and any other hole necessary for mounting parts to be accommodated in the cabinet 2.

After a preparatory procedure is set by registering the male mold 12 into the female mold 11 with the other arrangement ready, a molten material 17 is then introduced or charged into the space 15 defined between the male mold 12 and the female mold 11 so as to form the front base panel 3. The molten material charged thereinto is then allowed to cool to room temperaure to cure the molten material. The molded front base panel 3 is withdrawn by releasing the male mold 12 from the female mold 11 after the molten material 17 solidified.

Figure 8:
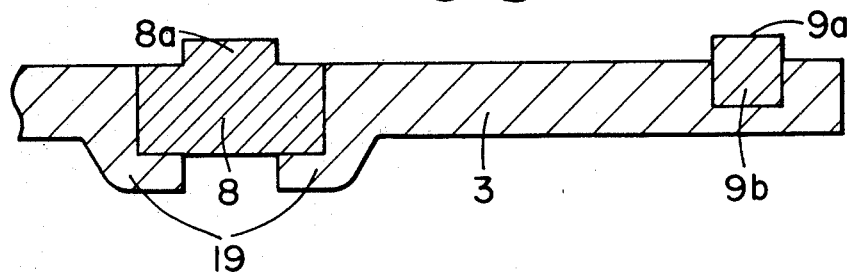
FIGS. 8 and 10, respectively, are cross-sectional views illustrating the portion of the front base panel, where the display element in the form of a plate is embedded, taken along the line C-C' of FIG. 7 in combination with the steps of the method in accordance with the present invention.

Turning now to FIG. 8 with reference to FIG. 7, the molten material 17 is introduced or charged into the space 15 defined so as to form extensions 19 to cover at least a portion or peripheral portions, as in this case, of the rear of the display element 8 with the opposite surface of the display element 8 exposed. As the extensions 19 are formed integrally with the rear surface of the front base panel 3, the display element is attached securedly to the front base panel 3 with causing no or less risk that it is removed or taken away even if a pressure or force would be applied backwards from the front side of the front base panel 3. On the other hand, as shown in FIG. 8, the display element 9 in the square U-shaped frame form mainly for adornment is embedded in the molten material so as not to expose its rear surface to the back surface of the front base panel 3. Thus, the display portions 8a of the display element 8 in the plate form and at least a portion of the display portion 9a of the display element 9 in the frame form are formed so as to project from the surface plane of the front base panel 3. Any other display element may be mounted in substantially the same manner as hereinabove mentioned.

Figure 9:
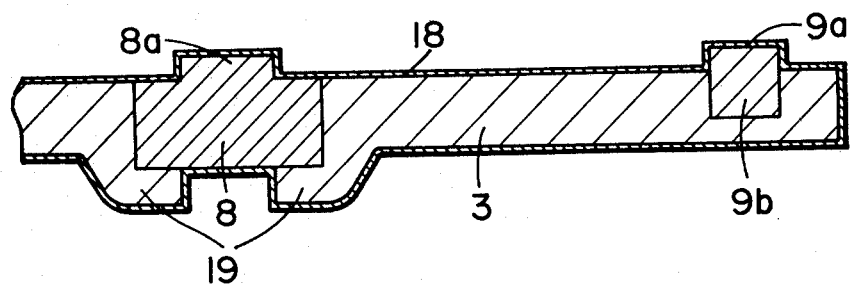

Referring to FIG. 9, the molded base panel 3, as prepared hereinabove, is then coated with a finish coating 18 in known manner as by spraying or brushing a material for finish coating or by immersing the molded base panel 3 in the finish coating bath to form a substantially uniform coating 18 having a thickness preferably from about 0.1 to 0.8 mm. A paint for the finish coating is not restricted to any particular one and may include, for example, a mixture of an acrylic resin or a urethane type resin with a lacquer. As the finish coating 18 is formed as a sole or single coating, no difference in color can be seen on the joint between the display elements 8 and 9 and the frong base panel 3. The finish coating 18 can function as rendering invisible any physical surface defects such a burrs, scars or wrinkles formed on the surface of the base panel during the molding or during the solidifying of the molded base panel after drying due to irregularities on temperatures. It can also color the cabinet 2 in a desired manner and render the value of goods higher.

Figure 10:
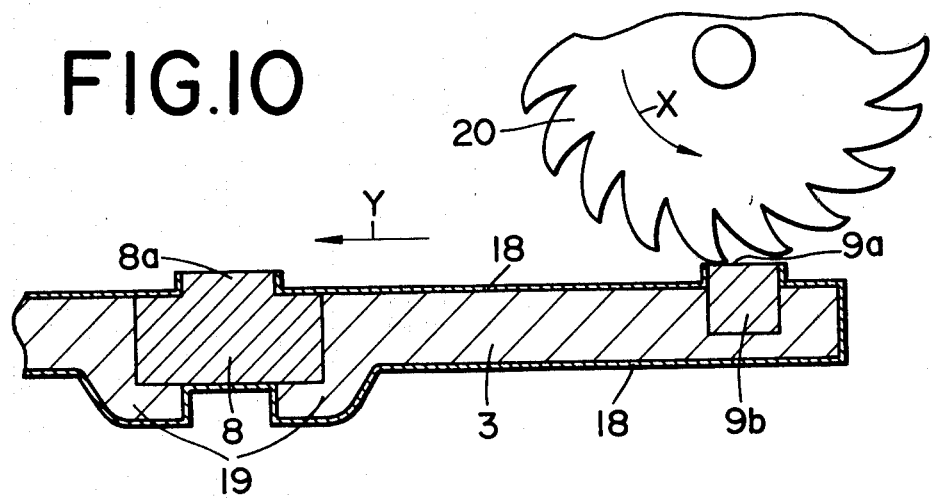

Referring now to FIG. 10, the front base panel 3 with the finish coating 18 formed thereon is then subjected to a finish surface treatment in order to expose the display portions 8a and 9a of the respective display elements 8 and 9. For this purpose, for example, milling may be effected to remove the coating 18 over the display portions 8a and 9a. The milling may be conducted by rotating the teethed tool 20 of a milling machine in the arrow direction as illustrated as the symbol "X", while transferring a table with the base panel 3 thereon in the arrow direction as illustrated as the symbol "Y", whereby the finish coating 18 over the display portions 8a and 9a is removed and further a portion of the surfaces of the display portions 8a and 9a is cut away and polished to provide a finished surface. The finish surface treatment with a grindstone or grinding wheel may be carried out by cutting in place of milling. The surface treatment can give an aesthetic, decorative or metallic appearance of the display elements 8 and 9. The surface treatment may be carried out in such a manner that, for example, scars by the teeth of the milling tool 20 are intentionally remained on the surfaces of the display portion 8a or 9a, thereby imparting another aesthetic and decorative appearance in order to satisfy diversified needs.

In accordance with the present invention, it is to be noted that, although the description is made heretofore mainly on the display elements 8 and 9, the number, shape and size of the display element to be provided in the front base panel 3 are not restricted to particular ones and may be chosen according to purposes and usages of the device or the like. If needed, the back base panel 4 may be prepared and treated in substantially the same manner as the front base panel 3. It is also to be noted, although needless to say, that, as hereinabove mentioned, the number, shape, type, size and the like of the display portion of the display element are not restricted to particular ones, too, and may be selected, depending upon purposes and usages of the display element although the description made hereinabove is directed mainly to the display portion 8a carrying capital letters "IC RADIO" representing the name of the device and the display portion 9a in the frame form. It can also be noted that a plurality of display elements as in this case are provided and the display elements used are of material different from each other, thereby giving a differently aesthetic and decorative appearance on the cabinet of the device. For example, when the display element 8 is composed of aluminum and the display element 9 is of brass, the front base panel 3 can impart a silver-like appearance on the display portion 8a of the display element 8 in good contrast to a combination with a golden-like appearance on the display portion 9a of the display element 9. It is further to be noted that a display element or elements such as the display element 9 in the frame form may be provided for the purpose of strengthening the front base panel 3 as well as for the purpoe of adorning the cabinet 2.

It is further to be noted that the crossbeam 9e of the display element 9 in the frame form is provided with holes 9f through which a part or parts of relatively heavy-weight such as a power transformer or a printed circuit board having circuit parts attached thereto may be connected to the cabinet 2. This allows the heavy weight not to be applied directly to the cabinet 2, thereby preventing the cabinet from being damaged or destroyed.

The front base panel 3 is then assembled with the back base panel 4 to give the cabinet 2 for the radio receiver 1 as shown in FIG. 1. This cabinet 2 possesses the display portions 8a and 9a glittering in metallic color in good and pronounced contrast to the other surface area of the front panel portion 3a in color different from the color or colors of the display portions 8a and 9a.

The cabinet 2 as hereinabove mentioned is particularly applicable to the radio receiver, but it should be noted that the present invention is not restricted to cabinets for radio receivers and may be applicable to a cabinet for any other device, instrument or apparatus.

I claim as my invention:

1. A method of forming a base panel for a cabinet for an electrical device comprising the steps of providing a female mold with a female cavity formed with depressions for receiving one or more display elements of a first material with at least one of said display elements formed with a cross bar, placing said one or more display elements in said depressions, inserting a male mold into said female cavity of said female die, filling a space between said male and female dies with molten synthetic resin material embedding said one or more display elements, removing said base panel from said male and female molds, covering exposed surfaces of said base panel including said display elements with a coating of finish material, and mechanically removing said finish coating from exposed surfaces of said display elements.

2. The method according to claim 1, wherein said base panel is embedded with at least two display elements of materials different in color from each other and portions of the surfaces of said display elements are treated by removing the coating thereon so as to expose the surface portions of said display elements having different color tones.

3. The method according to claim 1, wherein said synthetic resin base is provided with at least one display element which is a decorative display element in the form of a frame with its surface portion exposed from the base surface and the display element is disposed so as to reenforce the strength of the base.

4. The method according to claim 1, wherein at least one of said display elements is covered at its rear portion with an extension integrally and continuously formed in the synthetic resin base and the extension is disposed so as to allow the attachment of said display element to the base.

5. The method according to claim 1, wherein at least one of said display elements is provided with at least one projection representing a letter, figure or design.

6. The method according to claim 1, wherein said synthetic resin base forms a part of a cabinet.

7. The method according to claim 6, wherein at least one of said display elements is provided with means for mounting a part to be accommodated in the cabinet.

* * * * *